(No Model.)
I. KITSEE.
ELECTRIC RAILWAY.
No. 419,588. Patented Jan. 14, 1890.
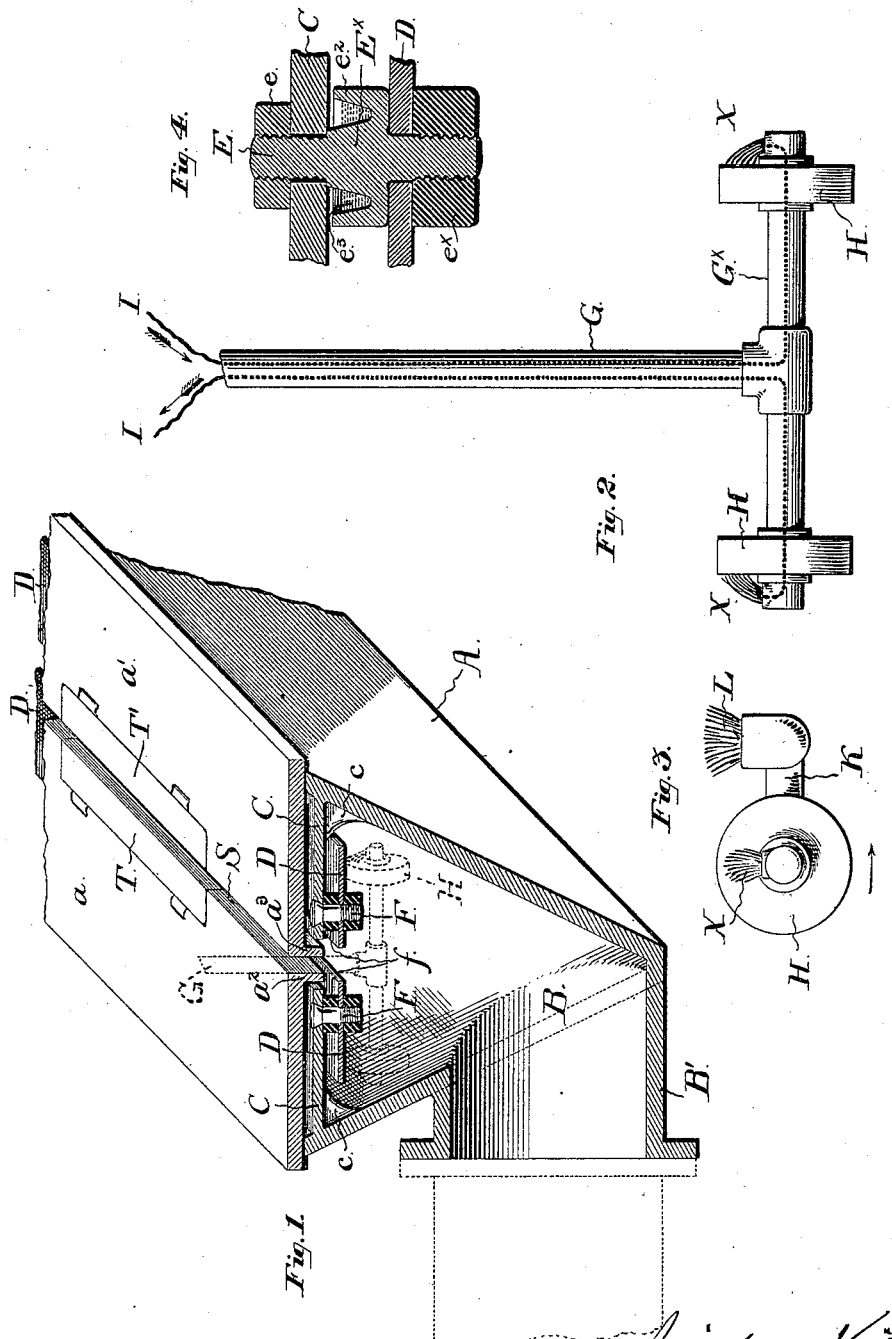
Witnesses:
F. Norman Dixon.
Lewis Altmaier.
Isidor Kitsee
Inventor
By his attorneys
J. Bonsall Taylor
Wm. C. Strawbridge

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

ELECTRIC RAILWAY.

SPECIFICATION forming part of Letters Patent No. 419,588, dated January 14, 1890.

Application filed February 23, 1889. Serial No. 300,949. (No model.)

*To all whom it may concern:*

Be it known that I, ISIDOR KITSEE, a citizen of the United States, residing in the city of Cincinnati, in the county of Hamilton, and State of Ohio, have invented certain new and useful Improvements in Electric Railways, of which the following is a specification.

My invention relates to a class of electric railways in which a slotted conduit contains, in circuit with a primary source of supply, a continuous longitudinally extending conductor or conductors proper, by contact with which a contact device carried by a car or other vehicle and passing therefrom through the slot into the conduit serves to convey the electricity from said conductor or conductors proper within the conduit to an electric motor connected with and carried by the car, or other vehicle, upon the roadway, for the driving of the car.

The object of my invention is to improve the construction of the conduit itself, to provide means for the more perfect support and insulation within the conduit of the conductor or conductors proper, and to insure more perfect and reliable electrical contact between the contact device itself and the conductors proper.

To the foregoing ends my invention comprehends the improvements hereinafter described and claimed, the particular subject matter claimed as novel being hereinafter definitely specified.

In the drawings, Figure 1 is a perspective view partly in cross section of a conduit constructed in accordance with my invention. Fig. 2 is an elevational view of a contact device to be carried by a vehicle, the appliances by which it is attached to said vehicle being omitted as of any usual and well known character. Fig. 3 is a side view of a wheel of the contact device, and an attached sweeper. Fig. 4 is a detailed view of one of the devices by which the conductors are supported in position within the conduit.

Similar letters of reference indicate corresponding parts.

In the drawings A is the conduit, which in the form of apparatus in which I have embodied my invention, is designed to be buried to such depth that its upper surface will be flush with the surface of the ground. The side walls of the conduit converge as they descend, so that in cross section they form a V. Webs $a\ a'$, each attached to or formed as a part of one of the side walls, constitute the surface plate of the conduit, so that the latter is of triangular cross section. A slot S between the webs serves for the passage of the contact arm, and the adjacent edges of the webs are preferably each provided with a depending flange $a^2\ a^3$, which serve both as guide plates for the arm G of the contact device, and to protect the conductors and their supporting and insulating devices within the conduit. A man hole in the upper surface of the conduit is filled by cover plates T T' supported upon the surface plates.

B is an escape port, the lower edge of which is preferably on a level with the lowest part of the interior of the conduit, and which in the drawings is shown as the orifice of a short pipe B' provided with a flange by means of which sewer pipes may be attached to it, cast integral with the conduit.

C are brackets, one projecting inwardly from each wall of the conduit, which, together with their supporting webs $c$, are attached to or formed as a part of the conduit. The brackets are conveniently horizontal and are situated as close beneath the surface plates as possible, being preferably only far enough removed therefrom to prevent the plates in the vibrations caused by street travel upon them, from coming into contact with the conductor-supporting devices mounted in said brackets.

D D are the conductors proper, one being the positive and the other the negative. These conductors are in communication with any source of electric supply and to insure the best contact with the contact device, made as elongated flat plates of conducting material. I find that conductors made of iron and plated or coated with copper, answer all requirements. The conductors are attached, by means of devices which I now describe to the brackets C, and, existing one at each side of the slot of the conduit, extend from end to end of the latter.

E are what I term the "supporters" a number of them being spaced, at proper distances apart, along the conduit. These supporters are designed to support the conductors, and to maintain them insulated. They are made of vulcanite, porcelain, glass, or kindred non-conducting material. Referring to the preferred form of supporter shown in Fig. 4, it will be seen that its upper extremity is threaded, and passes through an aperture in the bracket, C, above which said extremity projects and is equipped with and secured by a nut $e$, and that its lower extremity is also threaded and passes through an aperture in the conductor D, below which its projecting extremity is similarly equipped with a nut $e^x$ which supports said conductor D. Intermediate of its length and between the bracket and the conductor the supporter is provided with a boss or enlargement $E^x$ which should be of such size or so disposed as to prevent any such rising of the conducting plates, as would serve to break the contact with the contact devices. Surrounding and springing from the boss is a circumscribing upturned flange $e^2$ which with the boss forms an annular channel $e^3$, which is partly filled with oil, so that moisture upon the supporter derived from any source, and which might otherwise form a short circuit from the conductor to the bracket, will accumulate in the channel and be covered by the oil.

In Fig. 1 the supporters are shown as bolts F of vulcanite, porcelain, or kindred non-conducting material, which pass through the brackets and also through the conductors. Between the brackets and conductors they are provided with washers $f$ of non-conducting material, and below the conductors are equipped with supporting nuts also of non-conducting material.

A suitable contact device, by which a motor carried by a car to be propelled, is placed in communication with the conducting plates, is shown in Figs. 2 and 3 and formed as follows:—

G is a depending hollow arm, at its lower extremity provided with a transverse member $G^x$, also hollow. The members G and $G^x$ are conveniently made of non-conducting material.

H H are wheels of magnetized iron or other magnetized conducting material, mounted for rotation upon the transverse member $G^x$. The vertical member G of the contact device extends through the slot of the conduit, and its upper extremity is attached to the frame of the vehicle to which it is in any convenient manner applied, and at such elevation that the wheels H roll or tread upon the under faces of the conductors.

I I are the conducting wires, properly insulated from each other and from their surroundings, led down through the vertical member G of the contact device, and upon reaching the lower end thereof, led off in opposite directions through the transverse member $G^x$ to the wheels which as stated are in contact with the positive and negative conductors respectively. The extremities of the wires are electrically connected to the wheels by means of brushes X, which are mounted in the member $G^x$ one being placed near each wheel H, so that its free end is in constant contact with such wheel. The upper extremities of the wires are connected in any convenient manner with a motor situated within the vehicle designed to be propelled.

In order to prevent the possibility of ice, rust, or matter of any kind which may happen to accumulate on the tread surfaces of the conductors interrupting the electrical contact of a wheel H and its conductor, I attach two short forwardly projecting arms K to the transverse member $G^x$, upon each of which is mounted a sleeper L, which in the travel of the device sweeps obstructions from the conductor just in advance of the wheel, and so keeps the conductor clean.

The operation of the device will be apparent: The contact device comes into contact with the constantly charged positive and negative conductors within the conduit, and a circuit is formed from one of the conductors to the other, by means of the wheels, the brushes, and the wires extending into the car. An electric motor situated in the car, is energized by the current set up in the circuit and through suitable connective gearing propels the car. The wheels H H are a convenient means for taking the electricity from the conductors, as in the travel of the car they will roll along the surface of the conductors with little frictional wear upon said conductors,— but it is obvious that many other devices might be employed instead of the wheels,— and that, assuming wheels employed, instead of terminating in brushes which are as shown in contact with the wheels, the wires themselves might be set to bear directly against the wheels. The position of the conductors close beneath the surface plates is of advantage as they are then as far as possible out of reach of water or other matter deposited within the conduit. Water gaining access to the conduit will be carried away through the outlet port to the sewer.

Having thus described my invention, I claim and desire to secure by Letters Patent:

1. In an electric railway, an iron conductor or conductors in combination with magnetic contact devices, said magnetic contact devices being the terminals of the electric motor, as specified.

2. In an electrical railway, in combination, a conduit embodying a slot, brackets within the conduit, electric conducting plates, insulating supporters connected each to a bracket and to a conducting plate, and each embodying between the bracket and plate to which it is applied a boss provided with an oil cup, substantially as set forth.

3. In an electrical railway, in combination, a conduit embodying a slot, brackets within the conduit, electrical conducting plates, insulating supporters the upper extremities of each of which is secured to a bracket, the lower extremities to a conducting plate, and an insulating boss between the said bracket and conductor, whereby the latter is prevented from rising, substantially as set forth.

4. In combination, a conduit, conductors supported therein, a contact device adapted to be attached to a vehicle to be propelled, having projections which are magnets, adapted to make contact with said conductors, and which projections are the terminals of an electric motor, as specified.

In testimony that I claim the foregoing as my invention I have hereunto set my hand this 5th day of January, 1889.

ISIDOR KITSEE.

Witnesses:
 WM. C. STRAWBRIDGE,
 F. NORMAN DIXON.